(12) United States Patent
Temizel

(10) Patent No.: US 9,863,233 B2
(45) Date of Patent: Jan. 9, 2018

(54) METHOD AND SYSTEM OF SELECTING HYDROCARBON WELLS FOR WORKOVER

(75) Inventor: Cenk Temizel, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 712 days.

(21) Appl. No.: 14/381,350

(22) PCT Filed: Jun. 28, 2012

(86) PCT No.: PCT/US2012/044689
§ 371 (c)(1),
(2), (4) Date: Aug. 27, 2014

(87) PCT Pub. No.: WO2014/003763
PCT Pub. Date: Jan. 3, 2014

(65) Prior Publication Data
US 2015/0025864 A1    Jan. 22, 2015

(51) Int. Cl.
 *G06G 7/48*   (2006.01)
 *E21B 47/00*  (2012.01)
 *E21B 43/00*  (2006.01)

(52) U.S. Cl.
CPC .............. *E21B 47/00* (2013.01); *E21B 43/00* (2013.01)

(58) Field of Classification Search
CPC ....................................................... E21B 47/00
USPC .......................................................... 703/10
See application file for complete search history.

(56) References Cited

U.S. PATENT DOCUMENTS

| 6,810,332 B2 | 10/2004 | Harrison |
| 2003/0047308 A1 | 3/2003 | Hirsch et al. |
| 2003/0050758 A1 | 3/2003 | Soliman et al. |
| 2003/0110017 A1 | 6/2003 | Guthrie et al. |
| 2003/0173079 A1 | 9/2003 | Chikin |
| 2005/0038603 A1 | 2/2005 | Thomas et al. |
| 2005/0103491 A1 | 5/2005 | Newman et al. |
| 2006/0047527 A1 | 3/2006 | Caveny et al. |
| 2007/0078703 A1 | 4/2007 | Shipley et al. |
| 2008/0091283 A1 | 4/2008 | Balci et al. |

(Continued)

FOREIGN PATENT DOCUMENTS

| RU | 2350739 C2 | 3/2009 |
| SU | 883366 | 1/1979 |

OTHER PUBLICATIONS

European Patent Office, Supplementary European Search Report, dated Apr. 2, 2016, 4 pages, Europe.

(Continued)

*Primary Examiner* — Hugh Jones

(57) ABSTRACT

Selecting hydrocarbon wells for workover. At least some of the illustrative embodiment including: calculating a plurality of present-performance index values for a respectively plurality of wells, each present-performance index value based on a well's performance with respect to the plurality of wells, and each present-performance index value dimensionless; calculating a plurality of future-performance index values for the respective plurality of wells, each future-performance index value based on a well's expected future performance with respect to the plurality of wells, and each future-performance index value dimensionless; combining a present-performance index value and a future-performance index value for a first well to create a first combination index; combining a present-performance index value and a future-performance index value for a second well to create a second combination index; selecting the hydrocarbon well based on the first and second combination indices.

17 Claims, 5 Drawing Sheets

(56) References Cited

U.S. PATENT DOCUMENTS

| | | |
|---|---|---|
| 2009/0084545 A1 | 4/2009 | Banerjee et al. |
| 2009/0125367 A1 | 5/2009 | Brink et al. |
| 2009/0194274 A1 | 8/2009 | Del Castillo et al. |
| 2009/0299636 A1 | 12/2009 | Carnegie et al. |
| 2010/0214120 A1 | 8/2010 | Means et al. |
| 2011/0168391 A1 | 7/2011 | Saleri et al. |
| 2011/0307230 A1 | 12/2011 | Lee et al. |

OTHER PUBLICATIONS

Gerrit Nitters, Leo Roodhart, Hans Jongma, Valerie Yeager, Marten Buijse, Dwight Fulton, Jeff Dahl, and Eric Jantz, Structured Approach to Advanced Candidate Selection and Treatment Design of Stimulation Treatments, Oct. 1-4, 8 pages, SPE 63179, Society of Petroleum Engineers, Inc., 2000 SPE Annual Technical Conference and Exhibition, Dallas, Texas.

A.N. Martin and Michael J. Economides, Best Practices for Candidate Selection, Design and Evaluation of Hydraulic Fracture Treatments, Jun. 8-10, 2010, 13 pages, SPE 135669, Society of Petroleum Engineers, Inc., SPE Production and Operations Conference and Exhibition, Tunis, Tunisia.

The Federal Institute of Intellectual Property, Search Report, dated Feb. 25, 2016, 4 pages, Russia. (English Translation).

The Federal Institute of Intellectual Property, Search Report, dated Feb. 25, 2016, 5 pages, Russia.

Valko, P. et al., "Development and Application of the Multiwell Productivity Index (MPI)," Society of Petroleum Engineers Journal, vol. 5, No. 1, pp. 21-31, Mar. 2000.

PCT Application No. PCT/US2012/044689, PCT Search Report dated Jan. 14, 2013, 9 pp.

METHOD AND SYSTEM OF SELECTING HYDROCARBON WELLS FOR WORKOVER

BACKGROUND

In most later-developed oilfields, a plethora of information may be available to the production engineer to assist in making decisions, such as deciding which wells should be scheduled for workover operations. In many cases, the amount of information may cloud the decision making process. For example, when comparing just two wells, information such as water cut, oil production rate, gas production rate, and lift parameters as between the two wells may give mixed signals as the ranking the two wells for workover operations. The problem compounds exponentially when considering a significant number of wells and/or patterns of wells.

BRIEF DESCRIPTION OF THE DRAWINGS

For a detailed description of exemplary embodiments, reference will now be made to the accompanying drawings in which.

NOTATION AND NOMENCLATURE

Figure 1:
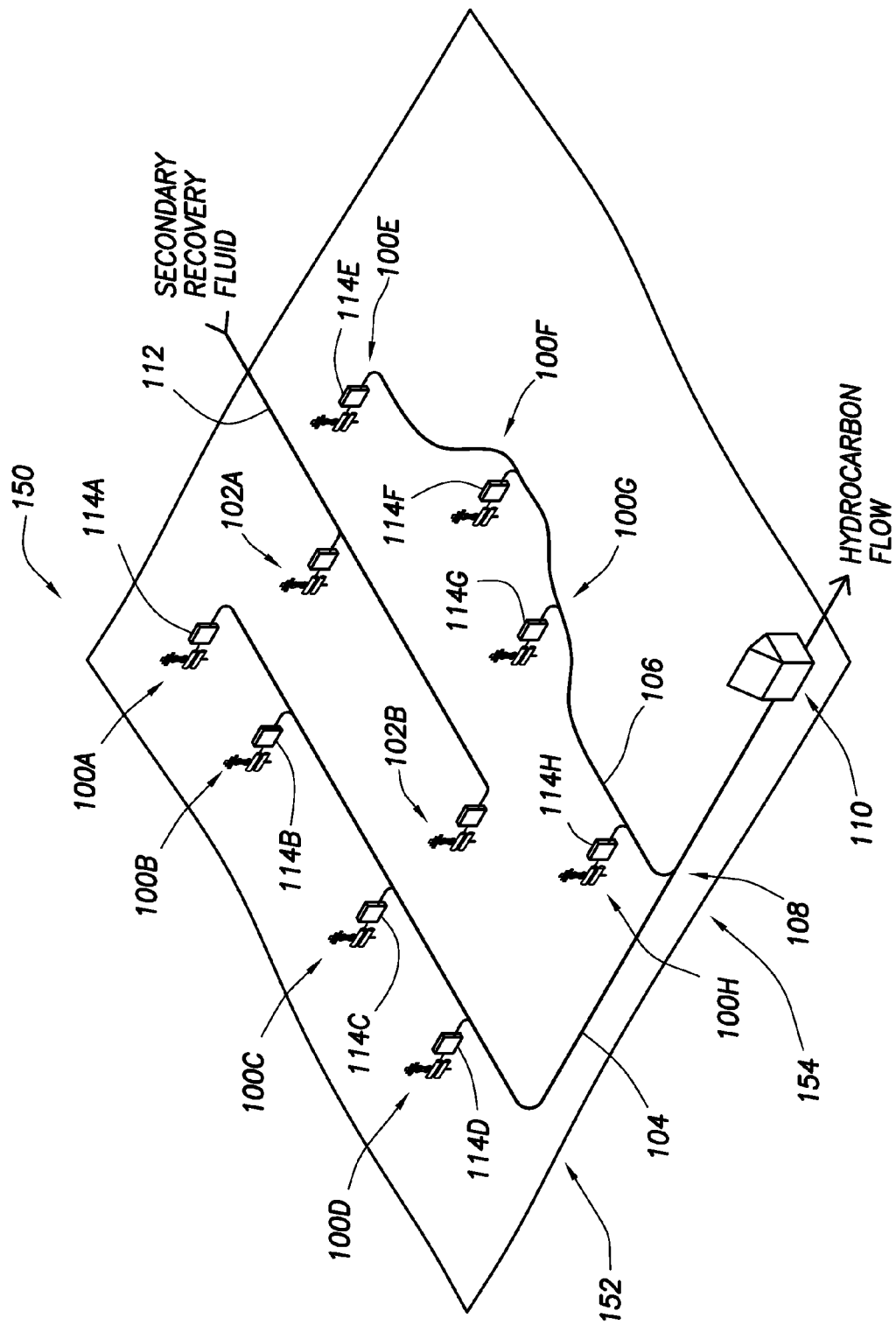
FIG. 1 shows a perspective view of a hydrocarbon producing field in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection.

"Production parameter" shall mean a measured value associated with hydrocarbons flowing from a well. An indication of water simultaneously produced with hydrocarbons shall be considered a production parameter.

"Pattern-level contribution" shall mean a contribution to a calculated value that takes into account a plurality of hydrocarbon wells in proximity to the well under consideration.

"Field-level contribution" shall mean a contribution to a calculated value that takes into account a plurality of hydrocarbon wells in proximity to the well under consideration, and where the proximity covers a greater area than the proximity with respect to pattern-level contributions.

"Workover" shall mean any of a variety of operations performed on a hydrocarbon wellbore after an initial completion of the hydrocarbon wellbore, such as removal and replacement of production tubing, removal and replacement of the downhole components of an artificial lift system, removal and replacement of one or more downhole packers, or performing operations with the respect to the completion (perforations, sand/gravel pack).

DETAILED DESCRIPTION

The following discussion is directed to various embodiments of the invention. Although one or more of these embodiments may be preferred, the embodiments disclosed should not be interpreted, or otherwise used, as limiting the scope of the disclosure or claims. In addition, one skilled in the art will understand that the following description has broad application, and the discussion of any embodiment is meant only to be exemplary of that embodiment, and not intended to intimate that the scope of the disclosure or claims is limited to that embodiment.

At least some of the various embodiments are directed to methods and systems of ranking and/or selecting hydrocarbon wells for workover operations, and more particular ranking and/or selecting hydrocarbon wells in water flood fields for workover operations. At least some embodiments are directed to a computer-implemented selection methodology that takes into account not only the individual performance of the well, but also the well's performance in view of the pattern-level performance and field-level performance. The specification first turns to an illustrative hydrocarbon producing field to orient the reader to the physical structure at issue, and then to various embodiments of selecting hydrocarbon wells for workover operations.

FIG. 1 shows a perspective view of a hydrocarbon producing field in accordance with at least some embodiments. In particular, the hydrocarbon producing field comprises a plurality of wellbores. Some wellbores are wells out of which hydrocarbons flow (i.e., hydrocarbon wells), and other wellbores are used for injection of secondary recovery fluids, such as water or compressed carbon dioxide (i.e., injection wells). In the illustrative case of FIG. 1, wells 100 (labeled 100A through 100H) are hydrocarbon wells, and wellbores 102 (labeled 102A and 102B) are injection wells. The location of each well is symbolized in the FIG. 1 by a valve stack, sometimes referred to as a "Christmas tree" in the industry, based primarily on its shape. The location of each well may seem random when viewed from above, but in most cases has a layout to increase the extraction efficiency of hydrocarbon from the underlying formation (not shown in FIG. 1).

In order to gather the produced hydrocarbons for sale, the hydrocarbon field has one or more production flow lines (sometimes "production line"). In FIG. 1, production line 104 gathers hydrocarbons from illustrative hydrocarbon wells 100A-100D, and production line 106 gathers hydrocarbons from illustrative hydrocarbon wells 100E-100H. The production lines 104 and 106 tie together at point 108, and then flow to a metering facility 110.

In some cases, the secondary recovery fluid is delivered to the injection wells by way of trucks, and thus the secondary recovery fluid may only be pumped into the formation on a periodic basis (e.g., daily, weekly). In other embodiments, and as illustrated, the second recovery fluid is provided under pressure to the injection wells 102A and 102B by way of pipes 112.

The hydrocarbon producing field of FIG. 1 illustratively has eight hydrocarbon wells, and two injection wells; however, the number of wells is merely illustrative. In practice, a hydrocarbon producing field may have many tens or even hundreds of wells to be managed. The illustration of FIG. 1 is presented with a limited number of wells so as not to unduly complicate the figure and the discussion, but such should not be read as a limitation as the applicability of the various embodiments. Further consider that all the hydrocarbon wells of FIG. 1 represent a field or field-level designation of wells (i.e., field 150). Further consider that wells 100A-100D represent a first pattern 152 or pattern-level designation (e.g., water flood operations from the injection wells affect wellbores 100A-100D as a group), and wells 100E-100H represent a second pattern 154 or pattern-level designation. Again, however, the illustration of FIG. 1 is presented with a limited number of wells in each pattern so as not to unduly complicate the figure and the discussion, but in practice each pattern may have many tens or hundreds of wells, and thus the limited number of wells in FIG. 1 should not be read as a limitation as the applicability of the various embodiments.

In accordance with at least some embodiments, each hydrocarbon well 100 has at least one, and in some cases more than one, measurement device for measuring parameters associated with the hydrocarbon production. FIG. 1 illustrates the measurement devices as devices 114A-114H associated one each with each hydrocarbon well 100A-100H. The measurement devices may take many forms, and the measurement devices need not be the same across all the hydrocarbon wells 100. In some cases, the measurement device may be related to the type of lift employed (e.g., electric submersible, gas lift, pump jack). In other cases, the measurement device on a hydrocarbon well may be selected based on a particular quality of hydrocarbons produced, such as a tendency to produce excess water. With the idea in mind that many variations on the selection of measurement devices are possible, even for similarly situated wells and/or wellbores in the same pattern, the specification now turns to an example list of such devices.

In some cases, one or more of the measurement devices 114 may be a multi-phase flow meter. A multi-phase flow meter has the ability to not only measured hydrocarbon flow from a volume standpoint, but also give an indication of the mixture of oil and gas in the flow. One or more of the measurement devices may be oil flow meters, having the ability to discern oil flow, but not necessarily natural gas flow. One or more of the measurement devices may be natural gas flow meters. One or more of the measurement devices may be water flow meters. One or more of the measurement devices may be pressure transmitters measuring the pressure at any suitable location, such as at the wellhead, or within the borehole near the perforations. In the case of measurement devices associated with the lift provided, the measurement devices may be voltage measurement devices, electrical current measurement devices, pressure transmitters measuring gas lift pressure, frequency meter measurement devices for measuring frequency of applied voltage to electric submersible motor coupled to a pump, and the like. Moreover, multiple measurement devices may be present on any one hydrocarbon producing well. For example, a well where artificial lift is provided by an electric submersible may have various devices for measuring hydrocarbon flow at the surface, and also various devices for measuring performance of the submersible motor and/or pump. As another example, a well where artificial lift is provided by a gas lift system may have various devices for measuring hydrocarbon flow at the surface, and also various measurement devices for measuring performance of the gas lift system.

Figure 2:
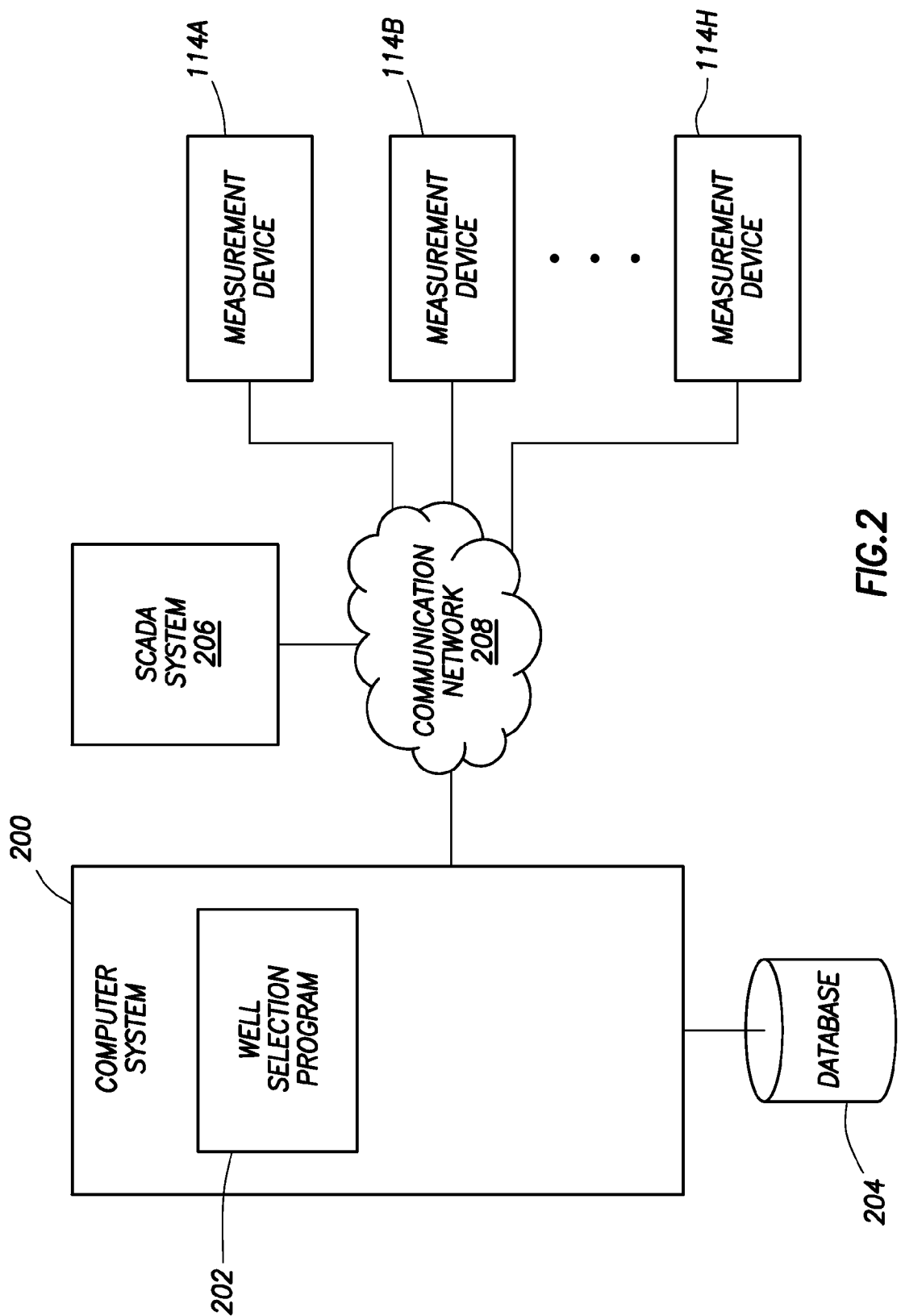
FIG. 2 shows a block diagram of a system in accordance with at least some embodiments.

FIG. 2 shows a block diagram of system in accordance with at least some embodiments. In particular, the system comprises a computer system 200 upon which one or more programs are executed. The computer system may take any suitable form. In some cases, the computer system 200 is a server computer system located at a data center associated with the hydrocarbon producing field. The data center may be physically located on or near the field, or the data center may be many hundreds or thousand of miles from the hydrocarbon producing field. In other cases, computer system 200 may be a laptop or desktop computer system. In yet still other cases, the computer system 200 may be a conglomeration of computer devices, such as portable devices communicatively coupled to other computer systems. Further still, the computer system 200 may be "cloud" computer systems, such that the precise location of the computer systems is not known to the user, or may change based on the computer load presented.

Regardless of the precise nature of the computer system 200, the computer system executes one or more programs that perform various calculations (discussed more below) associated with selecting hydrocarbon wells for workover operations, the one or more programs illustrated as well selection program 202. Well selection program 202 makes decisions and/or recommendations on which wells to subject to workover operations based on a variety of information. The information upon which decisions and/or recommendations are made may be historical information, such as stored in a database 204 coupled to the computer system 200. The information upon which decisions and/or recommendations are made may come from a supervisory control and data acquisition (SCADA) system 206 (which SCADA system itself may implement a database of historical values), coupled to the computer system 200 by way of a communication network 208. The information upon which decisions and/or recommendations are made may come directly to the computer system 200 from the measurement devices 114 themselves, coupled to the computer system 200 by way of the communication network 208. In some cases, the information upon which decisions and/or recommendations are made may come from multiple of the illustrative sources (e.g., the present reading, and a set of historical readings from the same device reaching back in time from the present).

The communication network 208 may take any suitable form. In some cases, the communication network 208 is a dedicated local- or wide-area network to which the various devices are coupled. In other cases, the communication network may involve in whole or in part the Internet, such as a virtual private network (VPN) carried over the Internet. From a hardware standpoint the communication network may involve electrical conductors, optical conductors, radio frequency electromagnetic wave signals propagated point-to-point, and/or satellite based communication.

Figure 3:
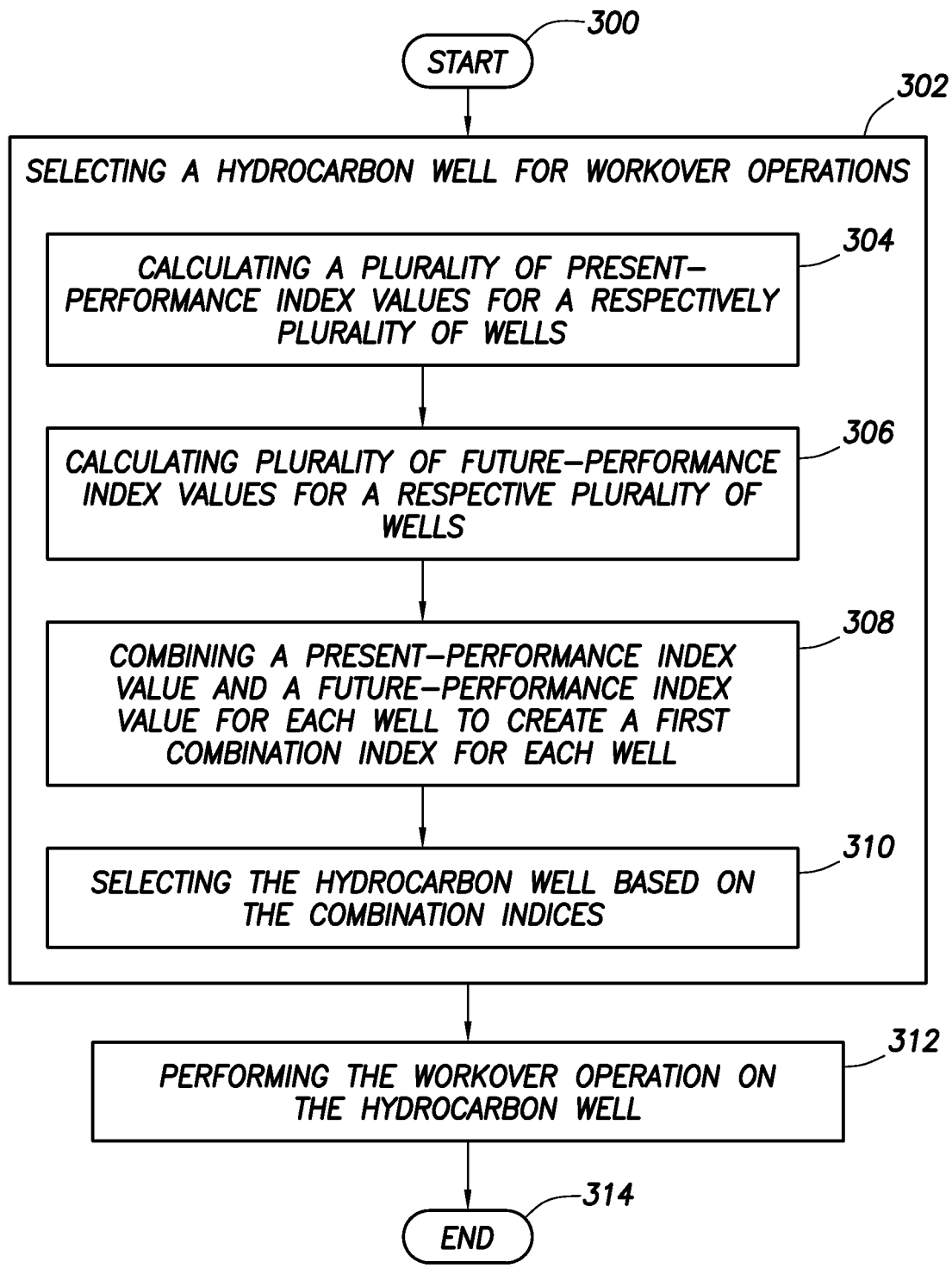
FIG. 3 shows a method in accordance with at least some embodiments.

Regardless of the type of communication network used, the computer system communicates with one or more devices and either selects a hydrocarbon wells for workover operations, or provides information to a human operator (e.g., production engineer) from which the human operator may then make a selection. FIG. 3 shows a method in accordance with at least some embodiments, and some of the illustrative steps may be performed by way of a computer program, such as well selection program 202. In particular, the method starts (block 300) and proceeds to selecting a hydrocarbon well for workover operations (block 302). The selection of the hydrocarbon well for workover operations may illustratively involve calculating a plurality of present-performance index values for a respectively plurality of wells (block 304). In some embodiments, each present-performance index value is based not only on a well's performance standing alone, but also may be based on performance with respect to the plurality of wells (such as the wells within the pattern and/or field). For example, considering a single well, the oil cut may be decreasing, but oil cut may also be decreasing for nearby wells, and such information may be considered in some embodiments. Moreover, in some cases each present-performance index value is dimensionless. Example methods of calculating present-performance index values are discussed more thoroughly below.

The illustrative method then proceeds to calculating a plurality of future-performance index values for the respective plurality of wells (block 306). In some embodiments, each future-performance index value is based not only on a well's expected future performance standing alone, but also may be based on performance with respect to the plurality of wells (such as the well's future performance considered within the pattern and/or field). Moreover, in some cases each future-performance index value dimensionless. Example methods of calculating future-performance index values are discussed more thoroughly below.

Still referring to FIG. 3, the illustrative method may then comprise combining a present-performance index value and a future-performance index value for each well to create a first combination index for each well (block 308). The combination index for each well may be a single numerical value, or the combination index may be a visual representation of the present- and future-performance index values for each wellbore. Example combination indices are discussed more below after introduction of example methodologies for calculating the present- and future-performance index values.

Regardless of the precise form of the combination indices, based on the combination indices the method then proceeds to selecting the hydrocarbon well based on the combination indices (block 310), and performing the workover operation on the hydrocarbon well (block 312). Thereafter, the method ends (block 314), possibility to be re-started again as soon as the workover rig completes the workover and/or another workover rig becomes available.

The specification now turns to example embodiments of calculating present-performance index values. In accordance with at least some embodiments, the present-performance values take into account field- and pattern-level aspects. The discussion first addresses various field-level parameters, pattern-level parameters, and well-level parameters.

Field-Level Parameters—Present-Performance Index

Field Oil Production Mean—(Acronym FieldOilProdRealMean)—This value represents the mean value of oil produced at the field level over a selected period of time, in some cases starting from the present and reaching back in time. Mean values may be calculated over any suitable period of time (e.g., day, week, month, lifetime, time since any suitable trigger event). An illustrative unit of measure for FieldOilProdRealMean is standard barrels of oil per day.

Field Water Production Mean—(Acronym FieldWaterProdRealMean)—This value represents the mean value of water produced at the field level over a selected period of time, in some cases starting from the present and reaching back in time. Mean values may be calculated over any suitable period of time (e.g., day, week, month, lifetime, time since any suitable trigger event). An illustrative unit of measure for FieldWaterProdRealMean is standard barrels of water per day.

Number of Wells in Field—(Acronym NumberWellsField)—this parameter is a value that represents the number of wells present in the field.

Number of Patterns in Field—(Acronym NumberPatternField)—this parameter is a value that represents the number of individual patterns present in the field.

Pattern-Level Parameters—Present-Performance Index

Pattern Oil Production Mean—(Acronym PatternOilProdRealMean)—This value represents the mean value of oil produced at the pattern level over a selected period of time, in some cases starting from the present and reaching back in time. Mean values may be calculated over any suitable period of time (e.g., day, week, month, lifetime, time since any suitable trigger event). An illustrative unit of measure for PatternOilProdRealMean is standard barrels of oil per day. In some cases, wells may be responsive to secondary fluid recovery from multiple injection wells. In these cases, the oil production from a single well may be apportioned between patterns by multiplying the contribution fraction for each pattern to the total oil production form the particular well.

Pattern Water Injection Rate Mean—(Acronym PatternWaterInjRateMean)—This value represents the mean value of water injected at the pattern level (e.g., considering all injection wells) over a selected period of time, in some cases starting from the present and reaching back in time. Mean values may be calculated over any suitable period of time (e.g., day, week, month, lifetime, time since any suitable trigger even). An illustrative unit of measure for PatternWaterInjRateMean is standard barrels of water per day.

Pattern Water Production Mean—(Acronym PatternWaterProdRealMean)—This value represents the mean value of water produced at the pattern level over a selected period of time, in some cases starting from the present and reaching back in time. Mean values may be calculated over any suitable period of time (e.g., day, week, month, lifetime, time since any suitable trigger event). An illustrative unit of measure for PatternWaterProdRealMean is standard barrels of water per day. In some cases, wells may be responsive to secondary fluid recovery from multiple injection wells. In these cases, the water production from a single well may be apportioned between patterns by multiplying the contribution fraction for each pattern to the total water production form the particular well.

Number of Wells in Pattern—(Acronym NumberWellsPattern)—this parameter is a value that represents the number of wells present in the field.

Well-Level Parameters—Present-Performance Index

Well Oil Production Mean—(Acronym WellOilProdRealMean)—This value represents the mean value of oil produced for a particular well over a selected period of time, in some cases starting from the present and reaching back in time. Mean values may be calculated over any suitable period of time (e.g., day, week, month, lifetime, time since last worker). An illustrative unit of measure for WellOilProdRealMean is standard barrels of oil per day.

Well Water Production Mean—(Acronym WellWaterProdRealMean)—This value represents the mean value of water produced for a particular well over a selected period of time, in some cases starting from the present and reaching back in time. Mean values may be calculated over any suitable period of time (e.g., day, week, month, lifetime, time since last worker). An illustrative unit of measure for WellWaterProdRealMean is standard barrels of oil per day.

The specification now turns to various calculated values, where the calculated values are based, in many cases, on the parameters detailed above.

Well Oil Production Rate Average with respect to the Field—(Acronym WellOilAvgwrtField)—The WellOilAvgwrtField calculated value relates the oil production from a single well to the field, and may be calculated as follows:

$$WellOilAvgwrtField = \frac{FieldOilProdRealMean}{NumberWellsField} \quad (1)$$

In other words, this calculated value is an indication of the average oil produced per well within field. An illustrative unit of measure for WellOilAvgwrtField is standard barrels of oil per day.

Well Oil Production Rate Average with respect to the Pattern—(Acronym WellOilAvgwrtPattern)—The WellOilAvgwrtPattern calculated value relates the oil production from a single well to the pattern within which the well resides, and may be calculated as follows:

$$WellOilAvgwrtPattern = \frac{PatternOilProdRealMrean}{NumberWellsPattern} \quad (2)$$

In other words, this calculated value is an indication of the average oil produced per well within the pattern. An illustrative unit of measure for WellOilAvgwrtPattern is standard barrels of oil per day.

Well Water Production Rate Average with respect to the Field—(Acronym WellWaterAvgwrtField)—The WellWaterAvgwrtField calculated value relates the water production from a single well to the field within which the well resides, and may be calculated as follows:

$$WellWaterAvgwrtField = \frac{FieldWaterProdRealMean}{NumberWellsField} \quad (3)$$

In other words, this calculated value is an indication of the average water produced per well within the field. An illustrative unit of measure for WellWaterAvgwrtField is standard barrels of water per day.

Well Water Production Rate Average with respect to the Pattern—(Acronym WellWaterAvgwrtPattern)—The WellWaterAvgwrtPattern calculated value relates the water production from a single well to the pattern within which the well resides, and may be calculated as follows:

$$WellWaterAvgwrtPattern = \frac{PatternWaterProdRealMean}{NumberWellsPattern} \quad (4)$$

In other words, this calculated value is an indication of the average water produced per well within the pattern. An illustrative unit of measure for WellWaterAvgwrtPattern is standard barrels of water per day.

Total Liquid Production in the Pattern—(Acronym PatternTotalLiqProdMean)—The PatternTotalLiqProdMean calculated value is the total liquid production (e.g., combined water and oil production) within a pattern, and may be calculated as follows:

PatternTotalLiqProdMean=PatternOilProdRealMean+
PatternWaterProdRealMean (5)

An illustrative unit of measure for PatternTotalLiqProdMean is standard barrels per day.

From the various parameters and calculated values above, certain further calculated values may be determined, which are discussed next. In a broad sense, each of the following calculated values may be considered to be normalized values related well performance (both oil and water) to the pattern and field.

Well Oil Performance Index with respect to the Field—(Acronym WellOilPerfwrtField)—The WellOilPerfwrtField calculated value is indicative of how well a particular well is or has performed considered against the average oil production in the field, and may be calculated as follows:

$$WellOilPerfwrtField = \frac{(WellOilProdRealMean - WellOilAvgwrtField)}{WellOilAvgwrtField} \quad (6)$$

Following the units in the right side of Equation (6), we see that the WellOilPerfwrtField is a dimensionless number.

Well Oil Performance Index with respect to the Pattern—(Acronym WellOilPerfwrtPattern)—The WellOilPerfwrtPattern calculated value is indicative of how well a particular well is or has performed considered against the average oil production in the pattern, and may be calculated as follows:

$$WellOilPerfwrtPattern = \frac{(WellOilProdRealMean - WellOilAvgwrtPattern)}{WellOilAvgwrtPattern} \quad (7)$$

Following the units in the right side of Equation (7), we see that the WellOilPerfwrtPattern is a dimensionless number.

Well Water Performance Index with respect to the Field—(Acronym WellWaterPerfwrtField)—The WellWaterPerfwrtField calculated value is indicative of how well a particular well is or has performed considered against the average water production in the field, and may be calculated as follows:

$$WellWaterPerfwrtField = \frac{(WellWaterProdRealMean - WellWaterAvgwrtField)}{WellWaterAvgwrtField} \quad (8)$$

Following the units in the right side of Equation (8), we see that the WellWaterPerfwrtField is a dimensionless number.

Well Water Performance Index with respect to the Pattern—(Acronym WellWaterPerfwrtPattern)—The WellWaterPerfwrtPattern calculated value is indicative of how well a particular well is or has performed considered against the average water production in the field, and may be calculated as follows:

$$WellWaterPerfwrtPattern = \frac{(WellWaterProdRealMean - WellWaterAvgwrtPattern)}{WellWaterAvgwrtPattern} \quad (9)$$

Following the units in the right side of Equation (9), we see that the WellWaterPerfwrtPattern is a dimensionless number.

Based on the further calculated values above that relate well performance to both the pattern and field, consideration of how well has performed with respect to its peer wells in the pattern and field may be given; however, in order not to double-count overlapping effects of pattern and field contributions in the present-performance index value, certain contribution coefficients may be used. The following paragraphs introduce example contributions coefficients.

Present Field Contribution Coefficient to Well Oil—(Acronym PFCCO)—The PFCCO calculated coefficient takes into account pattern oil production in relation to field oil production, and may be calculated as follows:

$$PFCCO = 1 - \left(\frac{PatternOilProdRealMean}{FieldOilProdRealMean}\right) \quad (10)$$

Given that the PatternOilProdRealMean and FieldOilProdRealMean both have units of standard barrels per day, the PFCCO coefficient is therefore dimensionless.

Present Pattern Contribution Coefficient to Well Oil—(Acronym PPCCO)—The PPCCO calculated coefficient is the pattern aspect that takes into account pattern oil production in relation to field oil production, and may be calculated as follows:

$$PPCCO = \left(\frac{PatternOilProdRealMean}{FieldOilProdRealMean}\right) \quad (11)$$

Given that the PatternOilProdRealMean and FieldOilProdRealMean both have units of standard barrels per day, the PPCCO coefficient is therefore dimensionless.

Present Field Contribution Coefficient to Well Water—(Acronym PFCCW)—The PFCCO calculated coefficient takes into account pattern water production in relation to field water production, and may be calculated as follows:

$$PFCCW = 1 - \left(\frac{PatternWaterProdRealMean}{FieldWaterProdRealMean}\right) \quad (12)$$

Given that the PatternWaterProdRealMean and FieldWaterProdRealMean both have units of standard barrels per day, the PFCCW coefficient is therefore dimensionless.

Present Pattern Contribution Coefficient to Well Water—(Acronym PPCCW)—The PPCCW calculated coefficient is the pattern aspect that takes into account pattern water production in relation to field water production, and may be calculated as follows:

$$PPCCW = \left(\frac{PatternWaterProdRealMean}{FieldWaterProdRealMean}\right) \quad (13)$$

Given that the PatternWaterProdRealMean and FieldWaterProdRealMean both have units of standard barrels per day, the PPCCO coefficient is therefore dimensionless.

Present-Performance Index

With various parameters calculated above, the specification now introduces an example present-performance index calculation. In particular, the well present-performance index in some embodiments has five components: a field-level oil contribution performance component; a pattern-level oil contribution performance component; a field-level water contribution performance component; a pattern-level water contribution performance component; and total liquid component. Thus, in some embodiments the present-performance index for a well may be calculated as follows:

$$PPI = \frac{(FieldOilContr + PattOilContr) - (FieldH2OContr + PattH2OContr)}{TotalLiquid} \quad (14)$$

where PPI is the present-performance index for the well, and where FieldOilContr is the field-level oil contribution performance component, which may be calculated as follows:

$$FieldOilContr = PFCCO * WellOilPerfwrtField \quad (15)$$

and where PattOilContr is the pattern-level oil contribution performance component, which may be calculated as follows:

$$PattOilContr = PPCCO * WellOilPerfwrtPattern \quad (16)$$

and where FieldH2OContr is the field-level water contribution performance component, which may be calculated as follows:

$$FieldH2OContr = PFCCW * WellWaterPerfwrtField \quad (17)$$

and where PattH2OContr is the pattern-level water contribution performance component, which may be calculated as follows:

$$PattH2OContr = PPCCW * WellWaterPerfwrtPattern \quad (18)$$

and where TotalLiquid is the total liquid component, which may be calculated as follows:

$$TotalLiquid = \frac{PatternWaterInjRateMean}{PatternTotalLiqProdMean} \quad (19)$$

The illustrative present-performance index of Equation (14) is an indication of the present performance of a well taking into account both field-level contributions and pattern-level contributions, and is a dimensionless number.

The specification now turns to example embodiments of calculating future-performance index values. In accordance with at least some embodiments, the future-performance index values take into account field- and pattern-level aspects. The discussion first addresses various field-level parameters, pattern-level parameters, and well-level parameters.

Field-Level Parameters—Future-Performance Index

Field Cumulative Oil Recovery at nth year—(Acronym FieldCumOilSim)—This value represents the cumulative expected oil produced at the field-level over a selected period of time into the future. The value may be determined by running a simulation or model of the reservoir using any of a variety of modeling software tools. Simulated values may be calculated over any suitable period of time (e.g., day, week, month, year, decade). An illustrative unit of measure for FieldCumOilSim is standard barrels of oil per day.

Field Cumulative Water Recovery at nth year—(Acronym FieldCumWaterSim)—This value represents the cumulative expected water produced at the field-level over a selected period of time into the future. The value may be determined by running a simulation or model of the reservoir using any of a variety of modeling software tools. Simulated values may be calculated over any suitable period of time (e.g., day, week, month, year, decade). An illustrative unit of measure for FieldCumWaterSim is standard barrels of oil per day.

Some field-level parameters introduced with respect to the present-performance index values (e.g., number of patterns in the field, number of wells in the field) are also used in the future-performance index values, but will not be re-introduced.

Pattern-Level Parameters—Future-Performance Index

Pattern Cumulative Oil Recovery at nth year—(Acronym PattCumOilSim)—This value represents the cumulative expected oil produced at the pattern-level over a selected period of time into the future. The value may be determined by running a simulation or model of the reservoir using any of a variety of modeling software tools. Simulated values may be calculated over any suitable period of time (e.g., day, week, month, year, decade). An illustrative unit of measure for PatternCumOilSim is standard barrels of oil per day.

Pattern Cumulative Water Recovery at nth year—(Acronym PatternCumWaterSim)—This value represents the cumulative expected water produced at the pattern-level over a selected period of time into the future. The value may be determined by running a simulation or model of the reservoir using any of a variety of modeling software tools. Simulated values may be calculated over any suitable period of time (e.g., day, week, month, year, decade). An illustrative unit of measure for PatternCumWaterSim is standard barrels of oil per day.

Pattern Cumulative Water Injection at nth year—(Acronym PatternWaterInjSim)—This value represents the expected quantity of water injected at the pattern level (e.g., considering all injection wells) over a selected period of time. Simulated values may be calculated over any suitable period of time (e.g., day, week, month, year, decade). An illustrative unit of measure for PatternWaterInjSim is standard barrels of water per day.

Well-Level Parameters—Future-Performance Index

Well Cumulative Oil Recovery at nth year—(Acronym WellCumOilSim)—This value represents the cumulative expected oil produced at the well-level over a selected period of time into the future. The value may be determined by running a simulation or model of the reservoir using any of a variety of modeling software tools. Simulated values may be calculated over any suitable period of time (e.g., day, week, month, year, decade). An illustrative unit of measure for WellCumOilSim is standard barrels of oil per day.

Well Cumulative Water Recovery at nth year—(Acronym WellCumWaterSim)—This value represents the cumulative expected water produced at the well-level over a selected period of time into the future. The value may be determined by running a simulation or model of the reservoir using any of a variety of modeling software tools. Simulated values may be calculated over any suitable period of time (e.g., day, week, month, year, decade). An illustrative unit of measure for WellCumWaterSim is standard barrels of oil per day.

The specification now turns to various calculated values, where the calculated values are based, in many cases, on the parameters detailed above.

Well Cumulative Oil Recovery Average with respect to the Field—(Acronym WellCumOilAvgwrtField)—The WellCumOilAvgwrtField calculated value relates the expected oil production from a single well to the field, and may be calculated as follows:

$$WellCumOilAvgwrtField = \frac{FieldCumOilSim}{NumberWellsField} \quad (20)$$

In other words, this calculated value is an indication of the average expected oil to be produced per well within field. An illustrative unit of measure for WellCumOilAvgwrtField is standard barrels of oil per day.

Well Cumulative Oil Recovery Average with respect to the Pattern—(Acronym WellCumOilAvgwrtPattern)—The WellCumOilAvgwrtPattern calculated value relates the expected oil production from a single well to the pattern within which the well resides, and may be calculated as follows:

$$WellCumOilAvgwrtPattern = \frac{PatternCumOilSim}{NumberWellsPattern} \quad (21)$$

In other words, this calculated value is an indication of the average oil expected to be produced per well within the pattern. An illustrative unit of measure for WellCumOilAvgwrtPattern is standard barrels of oil per day.

Well Cumulative Water Recovery Average with respect to the Field—(Acronym WellCumWaterAvgwrtField)—The WellCumWaterAvgwrtField calculated value relates the expected water production from a single well to the field within which the well resides, and may be calculated as follows:

$$WellCumWaterAbgwrtField = \frac{FieldCumWaterSim}{NumberWellsField} \quad (22)$$

In other words, this calculated value is an indication of the average water expected to be produced per well within the field. An illustrative unit of measure for WellCumWaterAvgwrtField is standard barrels of water per day.

Well Cumulative Water Recovery Rate Average with respect to the Pattern—(Acronym WellCumWaterAvgwrtPattern)—The WellCumWaterAvgwrtPattern calculated value relates the expected water production from a single well to the pattern within which the well resides, and may be calculated as follows:

$$WellCumWaterAvgwrtPattern = \frac{PatternCumWaterSim}{NumberWellsPattern} \quad (23)$$

In other words, this calculated value is an indication of the average water expected to be produced per well within the pattern. An illustrative unit of measure for WellCumWaterAvgwrtPattern is standard barrels of water per day.

Pattern Cumulative Total Liquid Recovery—(Acronym PatternCumTotalLiqProd)—The PatternCumTotalLiqProd calculated value is the expected total liquid production (e.g., combined water and oil production) within a pattern, and may be calculated as follows:

PatternCumTotalLiqProd=PatternCumOilSim+PatternCumWaterSim (24)

An illustrative unit of measure for PatternCumTotalLiqProd is standard barrels per day.

From the various parameters and calculated values above related to the future-performance index, certain further calculated values may be determined, which are discussed next. In a broad sense, each of the following calculated value may be considered to be normalized values related well expected performance (both oil and water) to the pattern and field.

Well Cumulative Oil Performance Index with respect to the Field—(Acronym WellCumOilPerfwrtField)—The WellCumOilPerfwrtField calculated value is indicative of how well a particular well is expected to perform considered against the expected average oil production in the field, and may be calculated as follows:

$$WellCumOilPerfwrtField = \frac{FieldCumOilSim}{NumberWellsField} \quad (25)$$

Following the units in the right side of Equation (25), we see that the WellCumOilPerfwrtField is a dimensionless number.

Well Cumulative Oil Performance Index with respect to the Pattern—(Acronym WellCumOilPerfwrtPattern)—The WellCumOilPerfwrtPattern calculated value is indicative of how well a particular well is expected to perform considered against the average expected oil production in the pattern, and may be calculated as follows:

$$WellCumOilPerfwrtPattern = \frac{PatternCumOilSim}{NumberWellsPattern} \quad (26)$$

Following the units in the right side of Equation (26), we see that the WellCumOilPerfwrtPattern is a dimensionless number.

Well Cumulative Water Performance Index with respect to the Field—(Acronym WellCumWaterPerfwrtField)—The WellCumWaterPerfwrtField calculated value is indicative of how well a particular well is expected to perform considered against the average expected water production in the field, and may be calculated as follows:

$$WellCumWaterPerfwrtField = \frac{FieldCumWaterSim}{NumberWellsField} \quad (27)$$

Following the units in the right side of Equation (27), we see that the WellCumWaterPerfwrtField is a dimensionless number.

Well Cumulative Water Performance Index with respect to the Pattern—(Acronym WellCumWaterPerfwrtPattern)—The WellCumWaterPerfwrtPattern calculated value is indicative of how well a particular well is expected to perform considered against the average expected water production in the field, and may be calculated as follows:

$$WellCumWaterPerfwrtPattern = \frac{PatternCumWaterSim}{NumberWellsPattern} \quad (28)$$

Following the units in the right side of Equation (28), we see that the WellCumWaterPerfwrtPattern is a dimensionless number.

Based on the further calculated values above that relate well expected performance to both the pattern and field, consideration of how a well is expected to perform with respect to the its peers wells in the pattern and field may be given; however, in order not to double-count overlapping expected effects of pattern and field contributions in the future-performance index value, certain contribution coefficients may be used. The following paragraphs introduce example contributions coefficients.

Potential Field Contribution Coefficient to Well Oil—(Acronym PotFCCO)—The PotFCCO calculated coefficient takes into account pattern expected oil production in relation to field expected oil production, and may be calculated as follows:

$$PotFCCO = 1 - \left(\frac{PatternCumOilProdSim}{FieldCumOilProdSim}\right) \quad (29)$$

Given that the PatternCumOilProdSim and FieldCumOilProdSim both have units of standard barrels per day, the PotFCCO coefficient is therefore dimensionless.

Potential Pattern Contribution Coefficient to Well Oil—(Acronym PotPCCO)—The PotPCCO calculated coefficient is the pattern aspect that takes into account pattern expected oil production in relation to field expected oil production, and may be calculated as follows:

$$PotPCCO = \left(\frac{PatternCumOilProdSim}{FieldCumOilProdSim}\right) \quad (30)$$

Given that the PatternCumOilProdSim and FieldOilProdSim both have units of standard barrels per day, the PotPCCO coefficient is therefore dimensionless.

Potential Field Contribution Coefficient to Well Water—(Acronym PotFCCW)—The PotFCCW calculated coefficient takes into account pattern water expected production in relation to field water expected production, and may be calculated as follows:

$$PotFCCW = 1 - \left(\frac{PatternCumWaterProdSim}{FieldCumWaterProdSim}\right) \quad (31)$$

Given that the PatternCumWaterProdSim and FieldCumWaterProdSim both have units of standard barrels per day, the PotFCCW coefficient is therefore dimensionless.

Potential Pattern Contribution Coefficient to Well Water—(Acronym PotPCCW)—The PotPCCW calculated coefficient is the pattern aspect that takes into account pattern water production in relation to field water production, and may be calculated as follows:

$$PotPCCW = \left(\frac{PatternCumWaterProdSim}{FieldCumWaterProdSim}\right) \quad (32)$$

Given that the PatternCumWaterProdSim and FieldCumWaterProdSim both have units of standard barrels per day, the PotPCCW coefficient is therefore dimensionless.

Future-Performance Index

With various parameters calculated above, the specification now introduces an example future-performance index calculation. In particular, the well future-performance index in some embodiments has five components: a field-level oil contribution expected performance component; a pattern-level oil contribution expected performance component; a field-level water contribution expected performance component; a pattern-level water contribution expected performance component; and total expected liquid component.

Thus, in some embodiments the future-performance index for a well may be calculated as follows:

$$FPI = \frac{(FieldOilContrE + PattOilEContrE) - (FieldH20ContrE + PattH20EContrE)}{TotalExpLiquid} \quad (33)$$

where FPI is the future-performance index for the well, and where FieldOilContrE is the field-level oil contribution expected performance component, which may be calculated as follows:

$$FieldOilContrE = PotFCCO*WellCumOilPerfwrtField \quad (34)$$

and where PattOilContrE is the pattern-level oil contribution expected performance component, which may be calculated as follows:

$$PattOilContrE = PotPCCO*WellCumOilPerfwrtPattern \quad (35)$$

and where FieldH20ContrE is the field-level water contribution expected performance component, which may be calculated as follows:

$$FieldH20ContrE = PotFCCW*WellCumWaterPerfwrtField \quad (36)$$

and where PattH20ContrE is the pattern-level water contribution expected performance component, which may be calculated as follows:

$$PattH2OContrE = PotPCCW*WellCumWaterPerfwrtPattern \quad (37)$$

and where TotalExp Liquid is the total expected liquid component, which may be calculated as follows:

$$TotalExpLiquid = \frac{PatternCumWaterInj}{PatternCumTotalLiqProd} \quad (38)$$

The illustrative present-performance index of Equation (33) is an indication of the expected future performance of a well taking into account both field-level contributions and pattern-level contributions, and is a dimensionless number.

Figure 4:
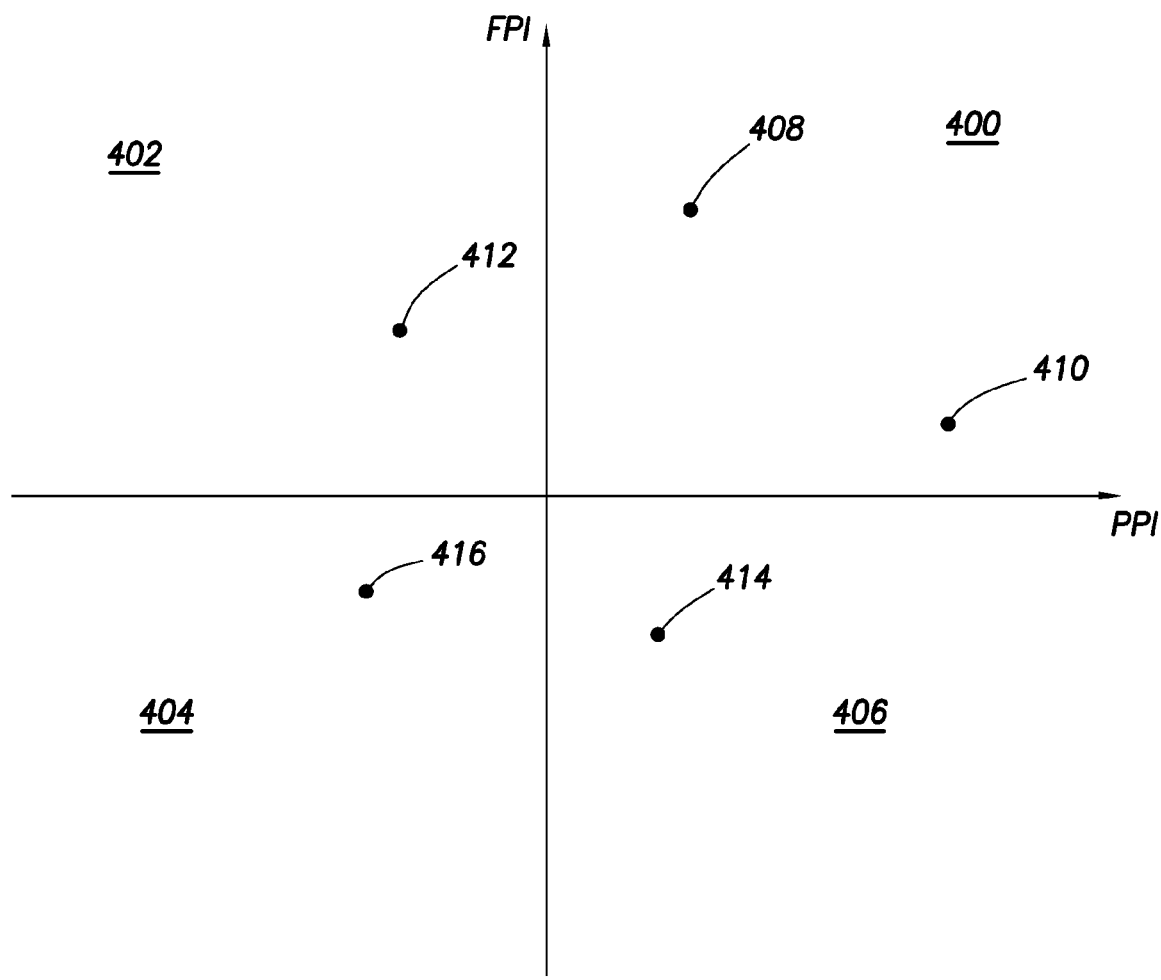
FIG. 4 shows a user interface in accordance with at least some embodiments.

Having described example embodiments of the present-performance index and the future-performance index, the specification now turns to combining the indices as a precursor to selecting a hydrocarbon well for workover operations. In particular, in some embodiments the present- and future-performance indices are combined graphically for display to a human operator (e.g., a production engineer). FIG. 4 shows plot in accordance with at least some embodiments. In particular, FIG. 4 shows a multi-dimensional plot (in the illustrative case of FIG. 4, a two-dimensional plot) where the X-axis is present-performance index and the Y-axis is future-performance index. Thus, the illustrative plot of FIG. 4 may be conceptually divided into four quadrants. Quadrant 400, where both the present-performance index and the future performance index are positive values, represents "good" present and future performance. Quadrant 402, where the present-performance index is negative but the future performance index is positive, represents "bad" current performance yet "good" future performance. Quadrant 404, where both the present-performance index and future performance index are negative, represents "bad" current and future performance. Finally, quadrant 406, where the present-performance index is positive but the future performance index is negative, represents "good" present performance but "bad" future performance.

When analyzing a field for selection of a workover candidate a present-performance index value and future-performance index value is calculated for each well. In some embodiments the present- and future-performance indices are combined graphically such that an indication of each well's present-performance index and future-performance index is plotted on the multidimensional plot (the plotted indication may be referred to as a combination index). FIG. 4 illustrative shows five indications—two in quadrant 400, and one each in quadrants 402, 404, and 406. The wells associated with indications 408 and 410 both have "good" present performance and "good" expected future performance, and thus are unlikely to be selected for workover. The well associated with indication 412 has "bad" present performance, but "good" expected future performance, and thus is unlikely to be selected for workover. The well associated with indication 414 has "good" present performance, but "bad" expected future performance. Finally, the well associated with indication 416 has "bad" present performance and "bad" expected future performance. Thus, of the wellbores associated with the illustrative indications in FIG. 4, the well associated with indication 414 is likely to be selected for workover.

Still referring to FIG. 4, consider a situation where a production engineer must choose for workover only wells whose indications reside in quadrant 400. In the illustrative situation, while the well associated with the indication 410 has "good" current performance, the future performance is low, and thus the well associated with indication 410 may be selected for workover. In this situation, the production engineer may "select" the indication 410 (e.g., place a cursor or pointer over the indication 410 and "click") as the mechanism to inform the computer system which will has been selected for workover operations.

In yet still other embodiments, the computer system that calculates the present- and future-performance indices may automatically select a well for workover operations. That is, based on the present- and future-performance indices the computer system may select a well for workover, the selection without input from a human operator. In such "automatic" embodiments, the computer system may make selections based on applying predetermined rules and/or machine intelligence regarding the indices created. For example, the computer system may select among the wells where respective indications, if plotted, would reside in the quadrant 404. It is noted that for computer-based selection without user input, there may not be a need to physically plot the indications as part of the selection process.

In other cases, the computer system may mathematically combine the present-performance and future-performance index for each well to create a combination index, and the computer system may then select a well for workover from the group of wells based on the magnitude of the combination indices. For example, in some embodiments the computer system may create the combination indices by, for each well, adding the present-performance index and future-performance index. In this way, wells with "good" present performance and future performance will have larger combination indices, and wells with "bad" present performance and future performance will have lower combination indices. The automatic selection may thus be a selection based on the well with the lowest combination index.

The various embodiments discussed to this point have assumed that workover selection was needed for a single well from a field or pattern; however, in other embodiments the selection criteria may be used to make pattern-level decisions. For example, workover rigs, while more mobile than drilling platforms, are large and expensive to move from place-to-place. An initial decision that a production engineer may need to make is a decision regarding within which pattern of a multi-pattern field to place a workover rig (and then individual well selections within the pattern may be made). By adding the present-performance index for each well in a pattern, and likewise adding the future-performance for each well in the pattern, a pattern-level present-performance index and a pattern-level future-performance index may be determined. By combining the pattern-level indices (such as by plotting similar to FIG. 4), the production engineer may make a decision regarding into which pattern a workover rig or rigs should be placed. Thereafter, the well-level determinations may be made as discussed above.

Figure 5:
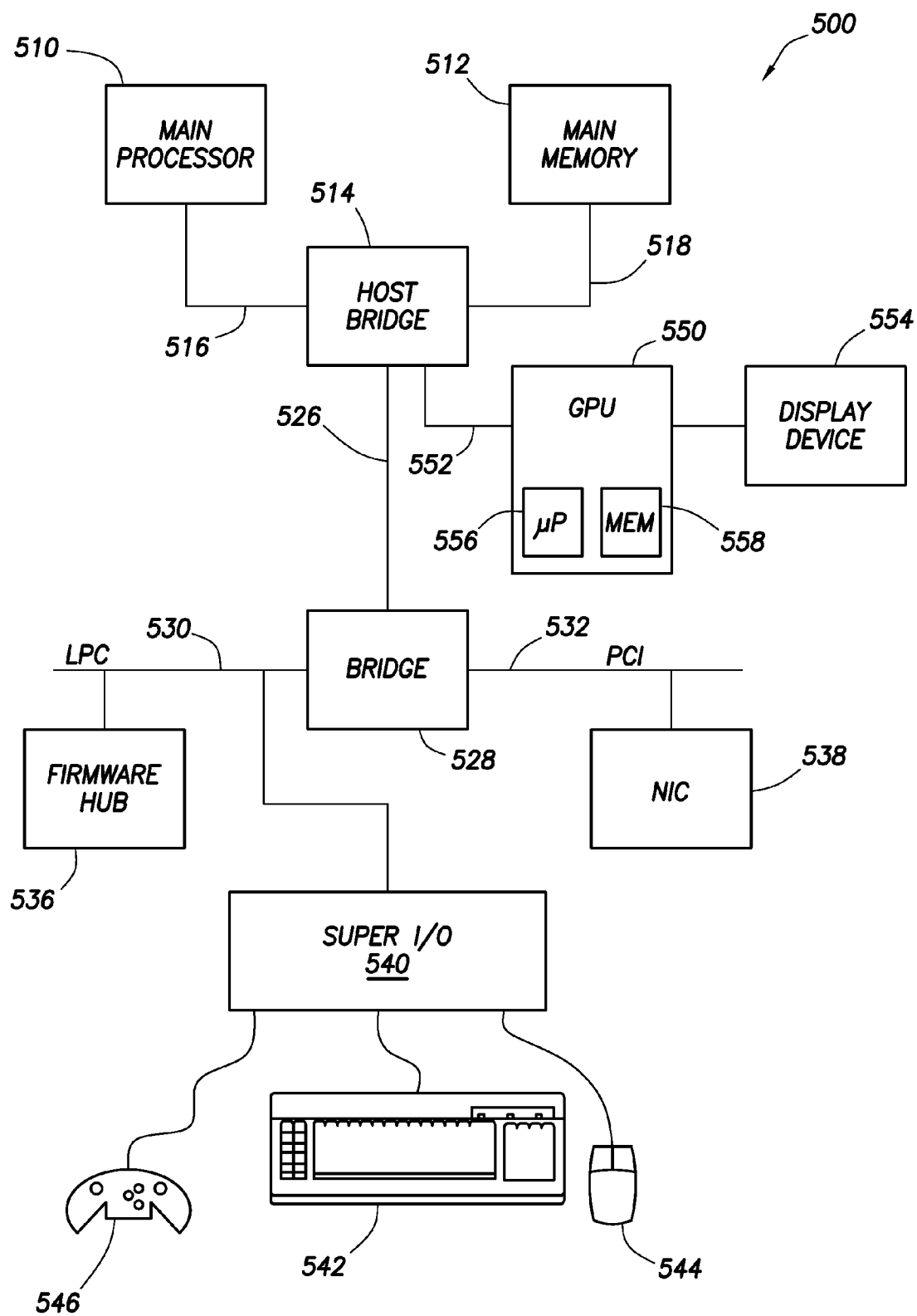
FIG. 5 shows a block diagram of a computer system in accordance with at least some embodiments.

FIG. 5 illustrates a computer system 500 in accordance with at least some embodiments. Any or all of the embodiments that involve calculating well- or pattern-level performance indices, displaying selected indices, and/or identifying wells/patterns for workover may be implemented in whole or in part on a computer system such as that shown in FIG. 5, or after-developed computer systems. In particular, computer system 500 comprises a main processor 510 coupled to a main memory array 512, and various other peripheral computer system components, through integrated host bridge 514. The main processor 510 may be a single processor core device, or a processor implementing multiple processor cores. Furthermore, computer system 500 may implement multiple main processors 510. The main processor 510 couples to the host bridge 514 by way of a host bus 516, or the host bridge 514 may be integrated into the main processor 510. Thus, the computer system 500 may implement other bus configurations or bus-bridges in addition to, or in place of, those shown in FIG. 5.

The main memory 512 couples to the host bridge 514 through a memory bus 518. Thus, the host bridge 514 comprises a memory control unit that controls transactions to the main memory 512 by asserting control signals for memory accesses. In other embodiments, the main processor 510 directly implements a memory control unit, and the main memory 512 may couple directly to the main processor 510. The main memory 512 functions as the working memory for the main processor 510 and comprises a memory device or array of memory devices in which programs, instructions and data are stored. The main memory 512 may comprise any suitable type of memory such as dynamic random access memory (DRAM) or any of the various types of DRAM devices such as synchronous DRAM (SDRAM), extended data output DRAM (EDO-DRAM), or Rambus DRAM (RDRAM). The main memory 512 is an example of a non-transitory computer-readable medium storing programs and instructions, and other examples are disk drives and flash memory devices.

The illustrative computer system 500 also comprises a second bridge 528 that bridges the primary expansion bus 526 to various secondary expansion buses, such as a low pin count (LPC) bus 530 and peripheral components interconnect (PCI) bus 532. Various other secondary expansion buses may be supported by the bridge device 528.

Firmware hub 536 couples to the bridge device 528 by way of the LPC bus 530. The firmware hub 536 comprises read-only memory (ROM) which contains software programs executable by the main processor 510. The software programs comprise programs executed during and just after power on self test (POST) procedures as well as memory reference code. The POST procedures and memory reference code perform various functions within the computer system before control of the computer system is turned over to the operating system. The computer system 500 further comprises a network interface card (NIC) 538 illustratively coupled to the PCI bus 532. The NIC 538 acts to couple the computer system 500 to a communication network, such the Internet, or local- or wide-area networks.

Still referring to FIG. 5, computer system 500 may further comprise a super input/output (I/O) controller 540 coupled to the bridge 528 by way of the LPC bus 530. The Super I/O controller 540 controls many computer system functions, for example interfacing with various input and output devices such as a keyboard 542, a pointing device 544 (e.g., mouse), a pointing device in the form of a game controller 546, various serial ports, floppy drives and disk drives. The super I/O controller 540 is often referred to as "super" because of the many I/O functions it performs.

The computer system 500 may further comprise a graphics processing unit (GPU) 550 coupled to the host bridge 514 by way of bus 552, such as a PCI Express (PCI-E) bus or Advanced Graphics Processing (AGP) bus. Other bus systems, including after-developed bus systems, may be equivalently used. Moreover, the graphics processing unit 550 may alternatively couple to the primary expansion bus 526, or one of the secondary expansion buses (e.g., PCI bus 532). The graphics processing unit 550 couples to a display device 554 which may comprise any suitable electronic display device upon which any image or text can be plotted and/or displayed. The graphics processing unit 550 may comprise an onboard processor 556, as well as onboard memory 558. The processor 556 may thus perform graphics processing, as commanded by the main processor 510. Moreover, the memory 558 may be significant, on the order of several hundred megabytes or more. Thus, once commanded by the main processor 510, the graphics processing unit 550 may perform significant calculations regarding graphics to be displayed on the display device, and ultimately display such graphics, without further input or assistance of the main processor 510.

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

References to "one embodiment", "an embodiment", "a particular embodiment" indicate that a particular element or characteristic is included in at least one embodiment of the invention. Although the phrases "in one embodiment", "an embodiment", and "a particular embodiment" may appear in various places, these do not necessarily refer to the same embodiment.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
receiving, by a computer system via a communication network from each of a plurality of measurement devices corresponding to a plurality of wells, measurements of at least one parameter associated with hydrocarbon flow for each of the plurality of wells;
calculating, by the computer system, a plurality of present-performance index values for the respective plurality of wells, based on the measurements received for each well, each present-performance index value based on a well's performance with respect to the plurality of wells, and each present-performance index value dimensionless;
calculating, by the computer system, a plurality of future-performance index values for the respective plurality of wells, each future-performance index value based on a well's expected future performance with respect to the plurality of wells, and each future-performance index value dimensionless;
combining, by the computer system, a present-performance index value and a future-performance index value for a first well to create a first combination index;
combining, by the computer system, a present-performance index value and a future-performance index value for a second well to create a second combination index;
selecting, by the computer system, at least one of the plurality of wells for a workover operation to be performed, based on the first and second combination indices; and
performing the workover operation on the at least one selected well.

2. The method of claim 1 wherein combining regarding the first well further comprises mathematically combining the present-performance index value and the future-performance index value for the first well to create the first combination index, the combination index a dimensionless number.

3. The method of claim 2 wherein the at least one well is selected from the plurality of wells, without input from a human operator, based on the first combination index.

4. The method of claim 1:
wherein combining regarding the first well comprises plotting a first indicator on a multi-dimensional plot at location within the plot defined by the present-performance index value and the future-performance index value for the first well; and
wherein combining regarding the second well comprises plotting second indicator on the multi-dimensional plot at location within the plot defined by the present-performance index value and the future-performance index value for the second well.

5. The method of claim 4 wherein selecting further comprises receiving, by the computer system from a human operator viewing the multi-dimensional plot on a display device coupled to the computer system, an indication of the at least one well to be selected.

6. The method of claim 1 wherein calculating further comprises, for each of the plurality of present-performance index values, including a pattern-level contribution component and a field-level contribution component to the present-performance index value.

7. The method of claim 1 wherein calculating further comprises, for each of the plurality of present-performance index values:
determining a pattern-level contribution regarding oil production; and
determining a pattern-level contribution regarding water production.

8. The method of claim 7 wherein calculating further comprises, for each of the plurality of present-performance index values:
determining a field-level contribution regarding oil production; and
determining a field-level contribution regarding water production.

9. A system comprising:
a plurality of hydrocarbon producing wells;
a plurality of measurement devices associated one each with each of the plurality of hydrocarbon producing wells, each measurement device measures at least one parameter associated with hydrocarbon flow;
a computer system communicatively coupled to the plurality of measurement devices, the computer system comprising a processor and a memory coupled to the processor, the memory storing a program that, when executed by the processor, causes the processor to:
calculate a plurality of present-performance index values for a respectively plurality of wells, each present-performance index value based on a well's performance with respect to the plurality of wells, and each present-performance index value dimensionless;
calculate a plurality of future-performance index values for the respective plurality of wells, each future-performance index value based on a well's expected future performance with respect to the plurality of wells, and each future-performance index value dimensionless; and
combine a present-performance index value and a future-performance index value for a first well to create a first combination index; and
combine a present-performance index value and a future-performance index value for a second well to create a second combination index.

10. The system of claim 9 wherein the program further causes the processor to display, on a display device, the first and second combination indices.

11. The system of claim 9 wherein when processor combines regarding the first well, the program causes the processor to mathematically combine the present-performance index value and the future-performance index value for the first well to create the first combination index, the combination index a dimensionless number.

12. The system of claim 11 wherein the program further causes the processor to select, based on the first combination index, a hydrocarbon well for workover operations.

13. The system of claim 9:
wherein when the processor combines regarding the first well, the program causes the processor to plot a first indicator on a multi-dimensional plot at location within the plot defined by the present-performance index value and the future-performance index value for the first well; and wherein when the processor combines regarding the second well, the program causes the processor to plot a second indicator on the multi-dimensional plot at location within the plot defined by the present-performance index value and the future-performance index value for the second well.

14. The system of claim 9 wherein the program further causes the processor to receive an indication from a human operator viewing the multi-dimensional plot, the indication being an identity of a hydrocarbon well for workover operations.

15. The system of claim 9 wherein when the processor calculates, the program causes the processor to, for each of the plurality of present-performance index values, include a pattern-level contribution component and a field-level contribution component to the present-performance index value.

16. The system of claim 9 wherein when the processor calculates, the program causes the processor to, for each of the plurality of present-performance index values:
   determine a pattern-level contribution regarding oil production; and
   determine a pattern-level contribution regarding water production.

17. The system of claim 16 wherein when the processor calculates, the program causes the processor to, for each of the plurality of present-performance index values:
   determine a field-level contribution regarding oil production; and
   determine a field-level contribution regarding water production.

* * * * *